United States Patent
Dahlman et al.

(10) Patent No.: US 6,912,228 B1
(45) Date of Patent: Jun. 28, 2005

(54) POWER CONTROL IN A RADIO DATA COMMUNICATION SYSTEM ADAPTED USING TRANSMISSION LOAD

(75) Inventors: Erik Dahlman, Bromma (SE); Stefan Parkvall, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/550,059

(22) Filed: Apr. 14, 2000

(51) Int. Cl.$^7$ ............................................... H04B 7/216
(52) U.S. Cl. ...................................... 370/441; 370/347
(58) Field of Search ................................. 370/231, 232, 370/234, 235, 318, 320, 332, 335, 428; 455/13.4, 522–526

(56) References Cited

U.S. PATENT DOCUMENTS

| | | | |
|---|---|---|---|
| 5,056,109 A | * 10/1991 | Gilhousen et al. | 375/1 |
| 5,982,760 A | * 11/1999 | Chen | 370/335 |
| 6,075,989 A | * 6/2000 | Moore et al. | 455/436 |
| 6,317,435 B1 | * 11/2001 | Tiedemann, Jr. et al. | 370/441 |
| 6,317,587 B1 | * 11/2001 | Tiedemann, Jr. et al. | 455/69 |
| 6,330,462 B1 | * 12/2001 | Chen | 455/572 |
| 6,347,091 B1 | * 2/2002 | Wallentin et al. | 370/437 |
| 6,366,570 B1 | * 4/2002 | Bhagalia | 370/342 |
| 6,445,679 B1 | * 9/2002 | Taniguchi et al. | 370/232 |
| 6,574,211 B2 | * 6/2003 | Padovani et al. | 370/347 |

FOREIGN PATENT DOCUMENTS

| | | |
|---|---|---|
| EP | 0 762 668 A | 3/1997 |
| EP | 0 936 753 A | 8/1999 |
| EP | 0 981 229 A | 2/2000 |
| EP | 0 986 276 A | 3/2000 |

OTHER PUBLICATIONS

TSG–RAN meeting #7, Madrid, Spain, Mar. 13–15, 2000, RP–000126, "Details of high speed downlink packet access", 5pgs.

CDMA/HDR: "A Bandwidth Efficient High Speed Wireless Data Service for Nomadic Users", Paul Bender et al., QUALCOMM, Incorporated, pp. 1–34.

* cited by examiner

*Primary Examiner*—Man U. Phan
*Assistant Examiner*—Toan Nguyen
(74) *Attorney, Agent, or Firm*—Nixon & Vanderhye P.C.

(57) ABSTRACT

The present invention employs a power control methodology that adapts to the transmission load associated with communications between a base station and a mobile terminal. In one example embodiment, the base station gradually adjusts the power data transmitted to the mobile terminal based on that associated transmission load. As a result, radio channel quality measurements influenced by that base station data transmission to the mobile terminal are not significantly affected by the transmit power adjustment. In other words, the rate at which the transmit power is changed is slower than the rate at which mobile stations measure channel quality. For example, mobile terminals may detect a signal-to-interference ratio every time slot and use that quality measurement for purposes of selecting a maximum transmission rate for the next time slot. The transmit power might be changed by an incremental amount once every ten time slots. By only gradually changing the base station transmit power, the accuracy of the mobile terminal channel quality estimates is not significantly affected. Moreover, if there is a relatively low transmission load, the base station does not waste resources or generate unnecessary interference by transmitting at maximum power.

28 Claims, 7 Drawing Sheets

BS = Base Station
S = Sector
MT - Mobile Terminal

POWER CONTROL IN A RADIO DATA COMMUNICATION SYSTEM ADAPTED USING TRANSMISSION LOAD

FIELD OF THE INVENTION

The present invention relates to data communications in a radio communications system, and more specifically, to adaptation of a radio link between a base station and a mobile terminal based on a current radio communication condition.

BACKGROUND AND SUMMARY OF THE INVENTION

There is an ever increasing convergence of the media industry (including television, video, three dimensional graphics, electronic publishing, and entertainment), the computer industry (including desktop computing, personal computers connected by local area networks, electronic mail, web sites etc.), and the telecommunications industry (both fixed and wireless communications networks). All of these converging industries rely on high-speed data communication capabilities.

High-speed data communication is particularly important for Internet communications. The Internet offers access to an extraordinary variety of information resources across the world. Typically, users make that access from a fixed location, such as their home, business, or school. However, cellular telephones, coupled with an increasing variety of other wireless devices, such as wireless laptops and personal digital assistance (PDAs), are changing otherwise fixed points of access to the Internet to include mobile access by these types of mobile terminals. For the sake of simplicity, the term "mobile terminal" is used to encompass all types of wireless devices.

Mobile radio packet data communications employ a different model than the circuit-switched model used, e.g., for traditional mobile radio voice communications. In circuit-switched communications, each communication link is allocated a dedicated radio channel, i.e., a frequency in an FDMA system, a time slot in a TDMA system, or a code in a CDMA system, for the duration of the communication with a mobile radio. Data to other users is not delivered over that dedicated channel, even if there are periods of silence in the communication when no data is being transmitted. Thus, although circuit-switched channels ensure minimal delay and a guaranteed bit rate, which is important for certain applications like voice communications, they are typically underutilized and also are usually limited in bandwidth. That limited bandwidth, while acceptable for certain applications like voice communications, is not well suited for many high speed data applications that require considerably more bandwidth.

Packet-based data communications are better suited for high speed data communications. Data packets are delivered individually using a "best effort," packet-switched network like the Internet. Individual packet routing means that the bandwidth may be used efficiently and that higher bandwidth applications may be accommodated. While wireline data terminals, e.g., personal computers, are capable of utilizing higher, packet-switched network bandwidth, wireless data terminals are at a considerable disadvantage. The bandwidth of the radio interface separating the wireless data terminals from wireline, packet-switched networks like the Internet is limited.

Accordingly, considerable efforts are being made to increase the bandwidth for wireless data communication. That increased bandwidth is particularly important in the radio "down link" direction from the radio network to the mobile terminal. For example, a mobile terminal user might send in the radio "up link" direction, a low bandwidth request, e.g., a command, to download a web page from a site on the Internet. Downloading the web page and other information (especially graphics) from that web site requires considerably more bandwidth.

Thus, some current designs for cellular systems based on Code Division Multiple Access. (CDMA) are focusing different models for achieving high speed data rates on the radio downlink. It may be optimal to multiplex several low data rate channels (with transmissions made orthogonal in the code domain) and share the available base station transmitted power using some form of power control. But this approach is less optimal when a small number of high data rate users share that common bandwidth. Inefficiencies increase even further when the same bandwidth is shared by low rate voice and high rate data users. Accordingly, in some current CDMA designs, low rate data services such as voice are separated from high rate data services using adjacent, non-overlapping spectrum allocations. Using a dedicated portion of the spectrum, high data rate downlink packet transmissions, as shown in FIG. 1, are time-multiplexed and transmitted at full power with data rates and slot lengths varying according to user channel conditions. When the user transmission queues are empty, the only transmissions from the base station are those of short pilot bursts and periodic transmissions of control information. The pilot bursts allow the mobile terminals to estimate the current channel conditions over the downlink.

Another problem confronting data communications over the radio interface is the variable quality of the radio channel or link from base station to mobile terminal (downlink). The detected radio channel or link quality depends on a number of factors including the transmit power level, the distance between the mobile terminal and a transmitting base station in the radio network, interference from other transmitting base stations and mobile terminals, path loss, shadowing, short term multi-path fading, etc. If the channel quality is good, the base station may modify the signal transmission parameters to increase the data transmission rate from the base station to the mobile terminal. On the other hand, if the channel quality is bad, the signal transmission parameters may need to be adjusted to lower the data transmission rate to ensure that the signal is reliably received.

The process of modifying one or more signal transmission parameters to compensate for channel quality variations is sometimes referred to as "link adaptation," where "link" refers to the radio link between a base station and a mobile terminal. Link adaptation may be accomplished by changing the transmit power of the base station, e.g., increasing the transmit power level for data transmitted to mobile terminals with a bad channel quality. Link adaptation may also be accomplished by changing the type of modulation and the amount of channel coding applied to the data to be transmitted by the base station. Moreover, link adaptation may be performed in the uplink by the mobile terminal.

Each base station may be divided into multiple sectors, where each sector serves a particular portion of the geographical area surrounding the base station. For example, each sector of a three sector base station serves approximately one third of the total geographical area surrounding that base station. Sometimes a base station or a base station sector is more generally referred to as an "access point" because it is a "point" where a mobile terminal may obtain access to the radio network.

The mobile terminal estimates the channel quality by measuring the signal quality of pilot signals or other broadcast signals transmitted by nearby "candidate" base station sectors, where some of the sectors may be associated with different base stations. Based on the estimated channel qualities, the mobile terminal determines a maximum data rate at which the mobile terminal can receive data for each base station sector and selects the sector with the highest data rate. The mobile terminal sends a rate/sector request message to one or more base stations in the radio network including information about a current estimate of a maximum supportable transmission rate as well as the currently requested sector to make the downlink transmission to the mobile terminal. That message also identifies a currently requested base station.

The performance of a link adaptation scheme depends on the accuracy of the signal quality measurement made by the mobile terminal. It is especially important that the signal quality measurements do not over-estimate the future signal quality. In the case of over-estimation, the link adaptation will select transmission parameters that are not sufficiently robust for the actual channel condition. Ideally, the goal of the mobile terminal is to accurately estimate a future radio channel condition at the time when the data packet transmission from the base station to the mobile terminal occurs. In other words, the mobile terminal should predict as accurately as possible the radio channel condition at some point in time in the future. A simple estimation technique is to measure the current signal quality at the mobile terminal of a signal received from the base station. Non-limiting examples of signal quality measurements include signal-to-noise ratio ($E_b/N_o$) and carrier-to-interference ratio (C/I). These current signal quality measurements are the estimates of the radio channel condition when the future packet transmission occurs. If the delay between the measurement and the actual packet transmission is sufficiently small, and if the actual signal quality measurements are accurate, this simple prediction technique is quite acceptable. For purposes of the following description, the measured signal quality is assumed to be carrier-to-interference ratio (C/I).

The carrier-to-interference ratio detected for a base station sector pilot signal received by a mobile terminal is affected by several factors which are generally divided into two groups: (1) the power of the signal whose quality is to be determined, and (2) the amount of noise and interference. If the interference from other transmitting base station sectors could be ignored, then the mobile terminal could simply decode each base station sector's pilot signal, and the accuracy of the signal quality measurement would be independent of the transmission of these other base station sectors. However, the transmissions from other base station sectors cannot be ignored. In fact, the interference detected by a mobile terminal may largely be attributable to other, non-selected base station sector transmissions.

Thus, in order to obtain an accurate signal quality measurement, it is desirable for all base station sectors to transmit at full power when the mobile terminal is measuring signal quality, regardless of the amount of data to transmit from each sector. Consider the signal quality estimation example shown in FIG. 2 for a synchronous, time division multiplex (TDM) radio communications system. In a synchronous TDM system, the time-multiplexed pilot symbols for each of the base station access points are transmitted at the same time as shown in FIG. 2. The mobile terminal can time its mi measurement to occur during a time period when all of the base station access points are transmitting their pilot signals.

If one or more base station access points does not transmit at full power when the mobile terminal measures the signal quality of the received pilot signal, the signal quality measurement may reflect a higher channel quality than what will actually exist when the data transmission occurs. Indeed, at the time the data transmission occurs, one or more inactive base station access points may have just started transmitting. One way of ensuring accurate signal quality estimates is to have all the base station access points transmit at full power during the pilot measurement time interval.

To ensure a "worst-case" signal quality estimate (i.e., correct or underestimated signal quality), all of the base station access points must be synchronized so that all mobile terminals know that all base station access points are active during the measurement time period. Unfortunately, in asynchronous radio communications, it is unlikely that all base station access points, e.g., sectors, are actively transmitting during the same measurement time interval. A simplified, asynchronous TDM example for two base station access points is shown in FIG. 3, where the time-multiplexed pilot and data time slots for each access point are offset from each other. If the signal quality measurement is made by the mobile terminal during a first time period $M_1$, both base station access points are transmitting at full power for both pilot and data. Therefore, an accurate estimate of the future signal quality, (e.g., C/I), when the information will be transmitted is obtained. On the other hand, during measurement time interval $M_2$, the access point 1 is not transmitting at full power for the full measurement time interval $M_2$. Therefore, a more favorable, and possibly incorrect, signal quality estimate is detected by the mobile terminal.

FIG. 4 shows a simplified example where the pilot and user data in each time slot are code multiplexed. The pilot is a fraction, e.g., 10%, of the total base station power and the user data is transmitted with the remaining power. In this case, when only the pilot is transmitted, as shown in measure time interval $M_2$, only a small percentage, e.g., 10%, of the base station transmit power is detected as interference by a monitoring mobile terminal.

One way of addressing this problem of inaccurate signal quality measurements in both synchronous and asynchronous systems is for all base station access points to transmit at full power continuously. This approach is illustrated for a TDM-type system in FIG. 5. If there are no data symbols to be sent, "dummy" data symbols are transmitted in the data field. This approach works as well in a CDM-type system shown in FIG. 6. The dummy data bits transmitted in the second time slot for base station access point 2 ensure that full transmit power is detected during measurement time intervals $M_1$ and $M_2$. In this way, the signal quality measurement by a mobile terminal is assured to be a worst case estimate over each time slot.

A downside with all access points continuously transmitting at full power is the waste of resources. Although fewer resources are wasted when the system is heavily-loaded and dummy symbols are rarely transmitted, this is not the case during low traffic periods. In addition to increasing power consumption, such full power transmission unnecessarily increases the general interference level (which reduces overall system capacity) as well as cooling needs at the base station.

These problems are avoided by the present invention. The transmission load between base station and mobile terminal is taken into account in controlling transmit power levels. This transmission load power control is implemented so that the accuracy of channel quality estimates is not significantly affected. While in a preferred example embodiment, the transmission load is in the downlink direction and the base station transmit power level is controlled, the invention may be employed in the opposite, uplink direction to implement mobile terminal power control.

The present invention employs a power control methodology that adapts to the transmission load associated with communications between a base station and a mobile terminal. The base station gradually adjusts the power at which data is transmitted to the mobile terminal based on that associated transmission load. As a result, radio channel quality measurements influenced by that base station data transmission to the mobile terminal are not significantly affected by the transmit power adjustment. In one example implementation, the rate at which the transmit power is changed is slower than the rate at which mobile stations measure channel quality. For example, mobile terminals may detect a signal-to-interference ratio every time slot and use that quality measurement for purposes of selecting a maximum transmission rate for the next time slot. The transmit power might be changed by an incremental amount once every ten time slots. In another example implementation, an even smaller incremental change is made every time slot. In both implementations, gradual changes to the base station transmit power do not significantly affect the accuracy of the mobile terminal channel quality estimates. Moreover, if there is a relatively low transmission load, the base station does not waste resources or generate unnecessary interference by transmitting at maximum power.

In a preferred, non-limiting, example implementation, a base station includes plural sectors, each sector includes signal processing and radio transceiving circuitry, a transmit buffer for storing packets to be transmitted to a mobile terminal, and data processing circuitry that adjusts the power at which the data packets are transmitted to the mobile terminal. That adjustment of transmit power is based upon the transmission load, e.g., number of packets to transmit, over a predetermined time period associated with the communication between the base station and mobile terminal. In one example implementation, the predetermined time period is preferably greater than one time slot during which the packet information is sent. In another example implementation, the predetermined time period may correspond to one time slot, but the amount of adjustment to the transmit power is relatively small.

In one non-limiting example, an average transmission load is determined based on a current amount of packet data stored in the transmit buffer corresponding to the mobile terminal, and an earlier amount of packet data previously detected and transmitted from the transmission buffer. If the current amount of data exceeds the previously transmitted amount of data, the transmit power is increased by an incremental amount (e.g., up to a maximum value). Conversely, if the current amount of data does not exceed the amount of data previously sent, the transmit power is decreased by an incremental amount (e.g., down to a minimum value). The adjustment of the base station sector transmit power may occur less frequently than the frequency at which mobile terminals determine the signal quality of base station transmissions. Alternatively, the incremental amount of change is made even smaller for more frequent power changes.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not necessarily to scale, emphasis instead being placed upon illustrating the principles of the invention.

DETAILED DESCRIPTION OF THE INVENTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be employed in any type of radio access system including frequency, time, and code division multiple access systems. In other instances, detailed descriptions of well know methods, interfaces, devices and signaling techniques are omitted so as not to obscure the description of the present invention with unnecessary detail. Individual functional blocks are shown in some of the figures. Those skilled in the art will appreciate that the functions may be implemented using individual hardware circuits, using software functioning in conjunction with suitably programmed digital microprocessor or general purpose computer, using an application-specific integrated circuit (ASIC), and/or using one or more digital signal processors (DSPs).

Figure 1:
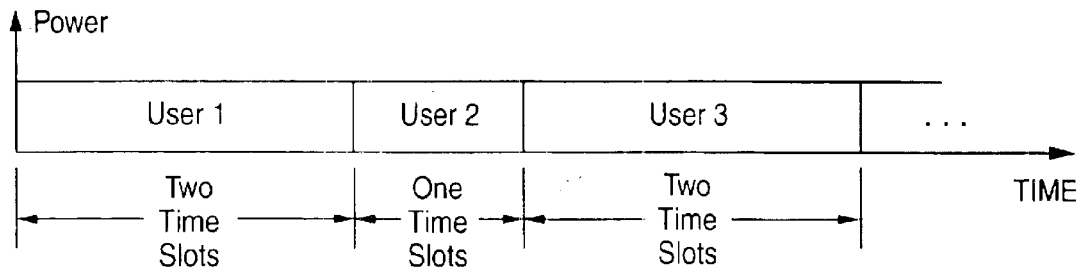
FIG. 1 is a graph illustrating a time multiplexed channel configuration used to transmit information for high data rate users.
Figure 2:
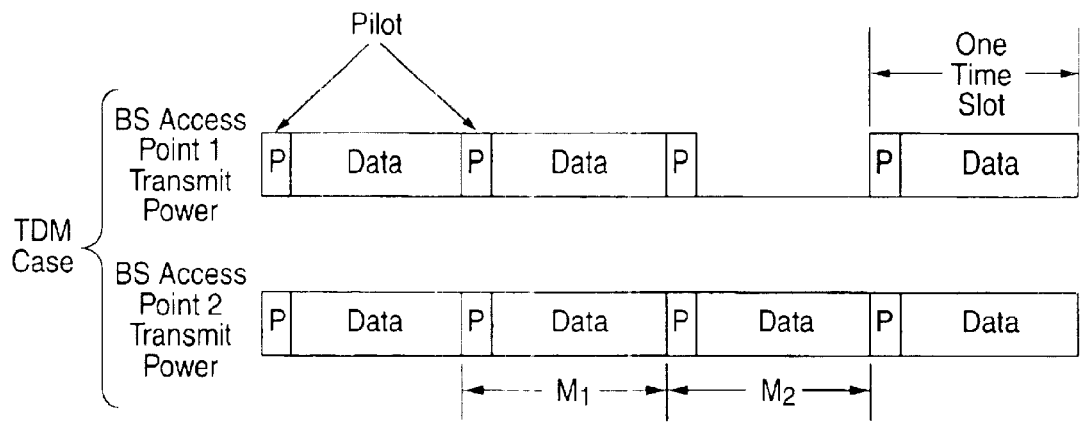
FIG. 2 is a diagram showing estimation of signal quality by a mobile terminal in a synchronous system with time-multiplexed pilot symbols.
Figure 3:
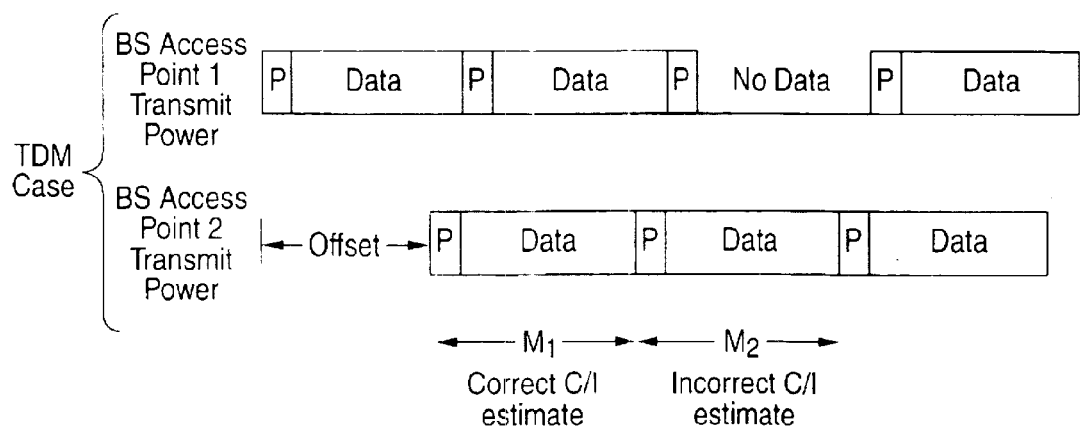
FIG. 3 is a diagram that illustrates signal quality estimation by a mobile terminal in an asynchronous system with time-multiplexed pilot symbols.
Figure 4:
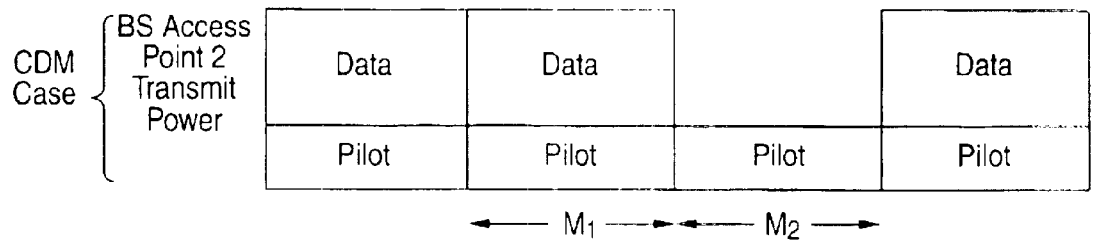
FIG. 4 is a diagram that illustrates signal quality estimation by a mobile terminal in an asynchronous system with code-multiplexed pilot symbols.
Figure 5:
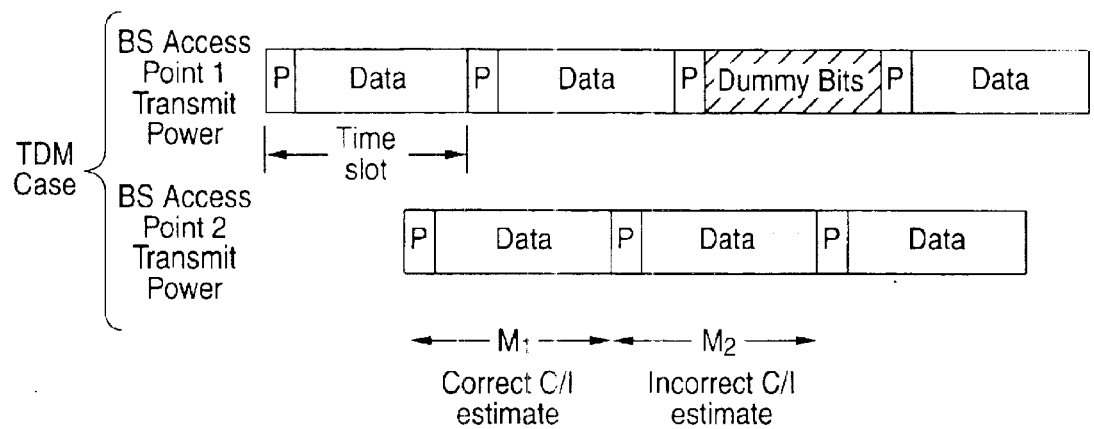
FIG. 5 is a diagram illustrating signal quality estimation in an asynchronous system with time-multiplexed pilot symbols in which all base station access points continuously transmit at full power.
Figure 6:
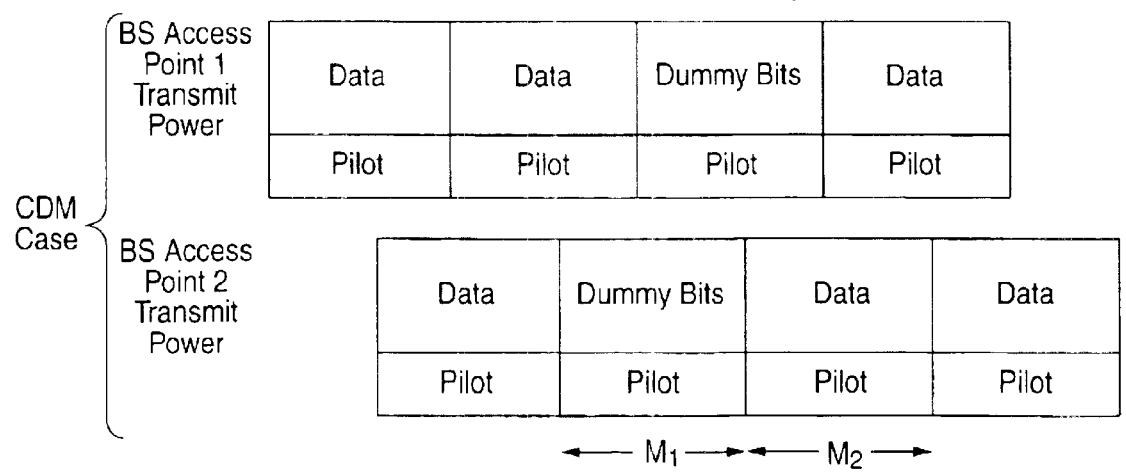
FIG. 6 is a diagram illustrating signal quality estimation in an asynchronous system with code-multiplexed pilot symbols in which all base station access points continuously transmit at full power.
Figure 7:
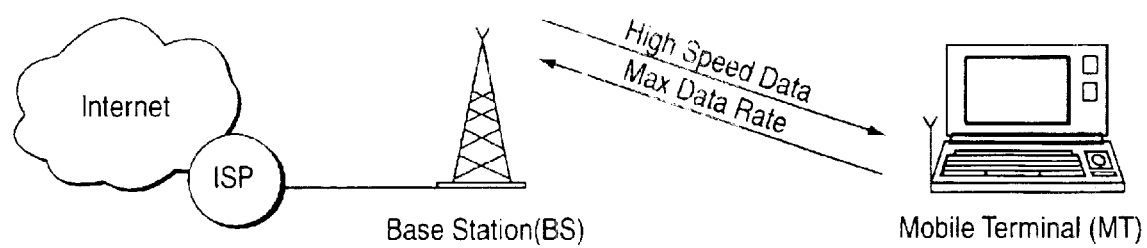
FIG. 7 is a diagram illustrating a mobile terminal connection with the Internet.

One scenario in which high speed data may need to be transmitted from the UTRAN over the radio interface to a mobile terminal is when the mobile terminal requests information from a computer attached to the Internet, e.g., a web site. FIG. 7 illustrates this scenario. The mobile terminal communicates over the radio interface with the Internet by way of a base station and an Internet Service Provider (ISP). As described earlier, the maximum transmission rate for transmitting data to meet certain performance levels, (e.g., a particular bit error rate), from the base station to the mobile terminal depends on the current radio channel quality between the base station and the mobile terminal. Example measures of the channel quality are signal-to-noise ratio ($E_b/N_o$) or signal-to-interference ratio (C/I). The mobile terminal determines the maximum data rate in view of that channel quality for a given level of error performance, using for example a preconfigured look up table, and provides that data rate information back to the base station.

Figure 8:
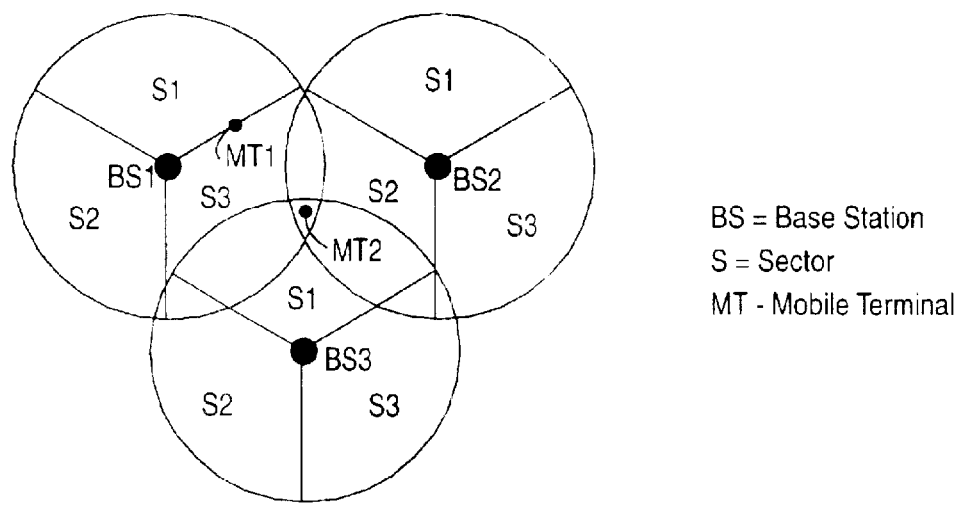
FIG. 8 is a diagram illustrating an example of three adjacent, sectored base stations.

Reference is made to FIG. 8 which shows three base stations BS1, BS2, and BS3 each having three sectors S1, S2, and S3. Each non-sectored base station and each sector of a sectored base station is considered an access point. In the following description, access points correspond to base station sectors. A first mobile terminal MT1 is located on the border between sectors S1 and S3 of base station BS1. A second mobile terminal MT2 is located in a region where all three base station coverage areas overlap. Both mobile terminals monitor the signal quality of the pilot channel transmissions from nearby base station sectors. The mobile terminal maintains a "candidate set" listing those sectors from which acceptable quality pilot channel signals are received. The signal qualities of those sectors in the candidate set are monitored at a high rate.

Each mobile terminal determines the signal quality of the pilot signals received from sectors in its candidate set. The signal quality values are each mapped to a value representing a maximum data rate for a given level of error performance. The mobile terminal requests the base station sector in its candidate set based on some criteria, e.g., the sector with the highest maximum data rate, and sends the sector/rate information to that sector. For high speed packet data transmission in the preferred example embodiment, only the requested sector transmits data to the mobile terminal at any given time.

The performance of a link adaptation scheme depends on the accuracy of the signal quality measurements made by mobile terminals. As described earlier, the goal of the mobile terminal signal quality measurements is to accurately estimate a future radio channel condition at the time when a data packet transmission from a base station sector to the mobile terminal occurs. Current signal quality measurements may be quite acceptable estimates of channel conditions for future packet transmissions if the delay between the measurement and the actual packet transmission is sufficiently small. However, the accuracy of the signal quality measurements depends on how well the current interference level reflects the actual interference level at the time of transmission. Although continuous, full power transmission from all neighboring access points provides the most conservative, worst case signal measurements, this approach is wasteful of power resources, unnecessarily increases the general interference level (thereby reducing overall system capacity), and unnecessarily increases cooling needs at the base station.

These problems are avoided by the present invention which employs a transmission load between base station and a mobile terminal to control transmit power levels. This transmission load power control is implemented so that the accuracy of future channel quality estimates is not significantly affected.

Figure 9:
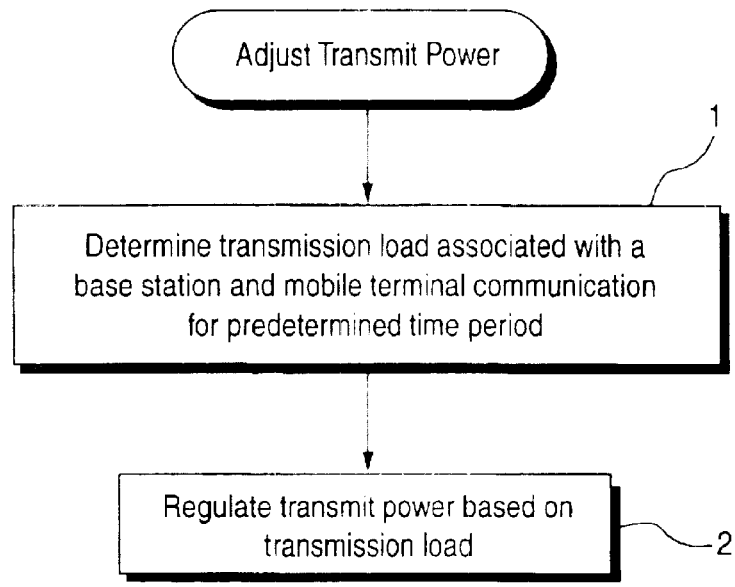
FIG. 9 is a diagram illustrating a transmit power adjustment method in accordance with one example embodiment of the invention.

FIG. 9 illustrates a general example embodiment for adjusting the transmit power of a base station access point or a mobile terminal in accordance with the present invention. First, the transmission load associated with a base station and a mobile terminal communication is determined for a predetermined time period (block 1). Based on that transmission load, the base station access point or the mobile terminal regulates its transmit power (block 2). Although the following example embodiment is described in the context of downlink transmissions between a base station and a mobile terminal, the present invention may also be employed in the uplink direction from the mobile terminal to the base station, where the mobile terminal regulates its transmit power based on the transmission load.

Figure 10:
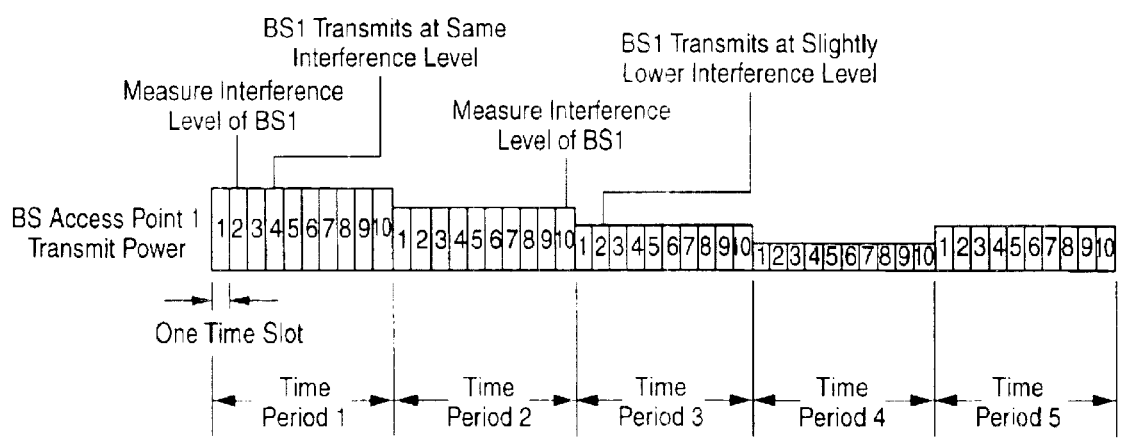
FIG. 10 is a diagram illustrating an example of the present invention.

In a downlink example, FIG. 10 illustrates for one example implementation how the present invention regulates base station transmit power without adversely impacting signal quality measurements by mobile terminals. One time slot is shorter than a base station adjustment time period. For example, while a time slot may be on the order of one or two milliseconds, a time period may be on the order of ten to twenty milliseconds. Initially, the base station access point 1 (which could either a base station or a base station sector) transmits at maximum power to a first mobile terminal. During the second time slot 2, a second mobile terminal near BS access point 1 measures received signal quality. At time slot 2, the interference amount contributed by base station access point 1 is at a maximum. Therefore, the signal quality measurement reflects the worse case interference from BS access point 1. At time slot 4, base station access point 1 continues to transmit at maximum power level. Since the amount of interference contributed by the base station access point 1 is the same in time slots 2 and 4, the signal quality estimate by the second mobile terminal for time slot 4 is accurate with respect to the interference contributed by BS access point 1. At the end of 10 time slots, corresponding in this example to a time period associated with adjusting the transmit power of base station access point 1, a decision is made by base station access point 1 that the transmission load to the first mobile terminal is decreasing. The base station access point 1 consequently decreases the transmit power at which it communicates with the first mobile terminal by an incremental amount.

An example incremental amount is 1.0 dB. If the base station adjustment time period is shorter, the incremental amount is preferably smaller. The goal is to ensure a gradual transmit power change. If the power is changed every time slot, the incremental amount should be fairly small, e.g., 0.1 dB in this non-limiting example.

During time period 2, the second mobile terminal measures the interference level of base station access point 1 during time slot 10. The amount of interference which is contributed by base station access point is 1 dB less than the interference level measured during time period 1. At the end of the tenth time slot of time period 2, the base station decides that the transmission load to the first mobile terminal is decreasing. Accordingly, the base station access point 1 again decreases the transmit power at which it communicates with the first mobile terminal by another incremental amount, e.g., 1 dB. At time slot 2 in time period 3, the base station access point 1 transmits at a slightly lower interference level than measured by the second mobile terminal during time slot 10 in time period 2. Because the transmit power level of base station access point 1 is only gradually reduced, the measurement of interference contributed by base station access point 1 is not significantly affected, at least as compared to a situation where the second mobile terminal measures a full power interference level during one time slot and then two time slots later, the actual transmit power level is zero when there is no data to send.

At the end of ten time slots in time period 3, the base station access point 1 again detects that the transmission load to the first mobile terminal is decreasing and again decreases the transmit power by 1 dB. Thus, the change of power from full power to a 3 dB reduced power level occurs over thirty time slots. At the end of time period 4, the base station access point 1 detects an increase in the transmission load to the first mobile terminal and increases the transmit power at which it communicates to the first mobile terminal by an incremental amount, e.g., 1 dB. Accordingly, both decreases and increases in the base station access point transmit power occur incrementally and gradually over many time slots.

In addition to substantially preserving the accuracy of mobile terminal signal quality channel measurement estimates, the present invention includes the additional benefits of reducing the interference level (thereby increasing overall system capacity) as well as reducing the waste of resources such as unnecessary power consumption and cooling requirements.

Figure 11:
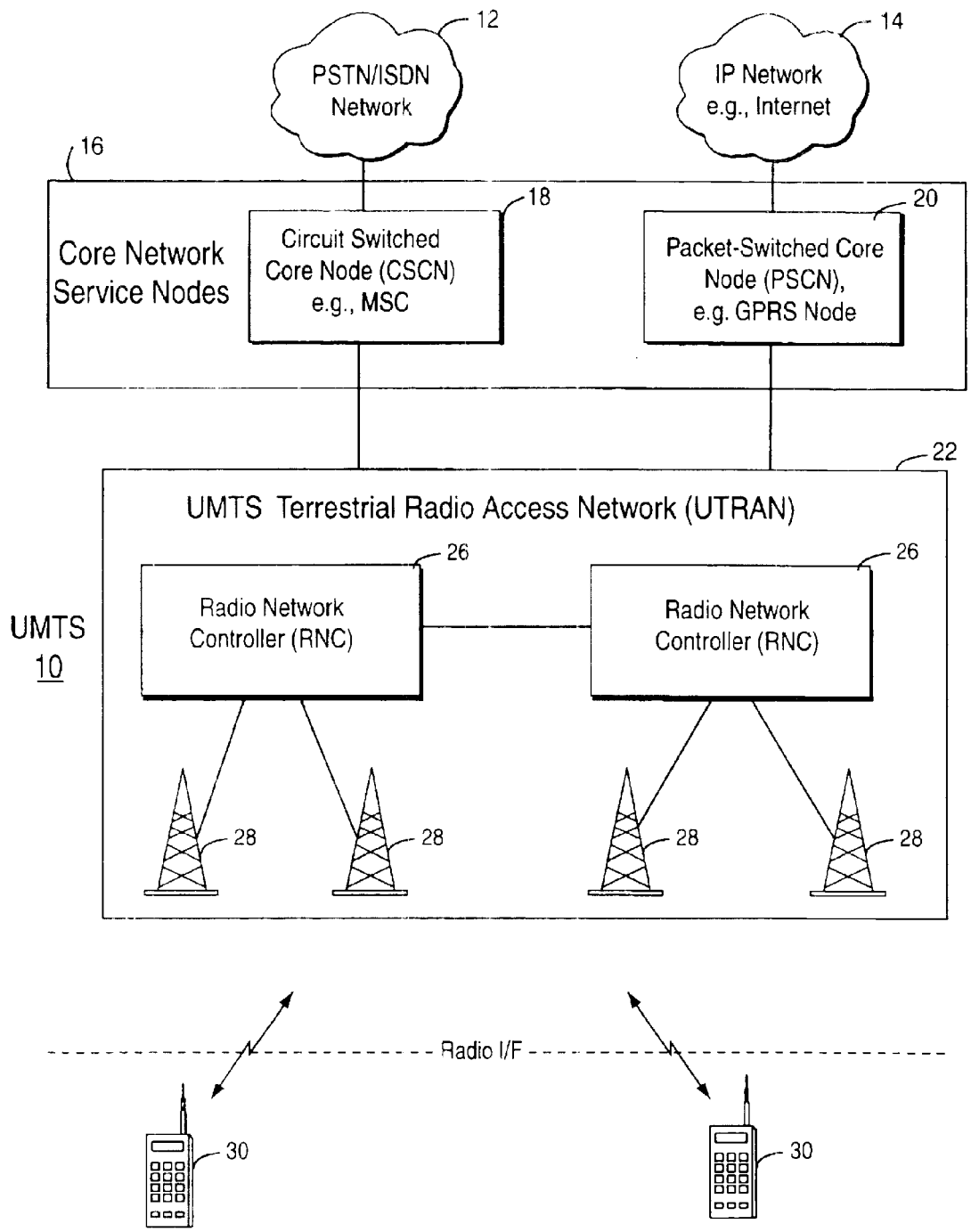
FIG. 11 is a non-limiting example of a mobile communication system in which the present invention may be employed.

One example, non-limiting environment in which the present invention may be employed is in the context of a Universal Mobile Telecommunication System (UMTS) 10 shown in FIG. 11. A representative, circuit-switched core network, shown as a cloud 12, may be for example the Public Switched Telephone Network (PSTN) or the Integrated Services Digital Network (ISDN). A representative, packet-switched core network, shown as a cloud 14, may be for example an IP network like the Internet. Both core networks are coupled to corresponding core network service nodes 16. The PSTN/ISDN circuit-switched network 12 is connected to a circuit-switched service node shown as a Mobile Switching Center (MSC) 18 that provides circuit-switched services. The packet-switched network 14 is connected to a General Packet Radio Service (GPRS) node 20 tailored to provide packet-switched type services.

Each of the core network service nodes 18 and 20 connects to a UMTS Terrestrial Radio Access Network (UTRAN) 24 that includes one or more Radio Network Controllers (RNCs) 26. Each RNC is connected to a plurality of Base Stations (BS) 28 and to any other RNCs in the UTRAN 22. Radio communications between the base stations 28 and Mobile Terminals (MT) 30 are by way of a radio interface. Radio access is based on WideBand CDMA (WB-CDMA) with individual radio channels distinguished using orthogonal spreading codes. Wideband CDMA provides wide radio bandwidth for multiple media services including packet data applications that have high data rate/bandwidth requirements.

Figure 12:
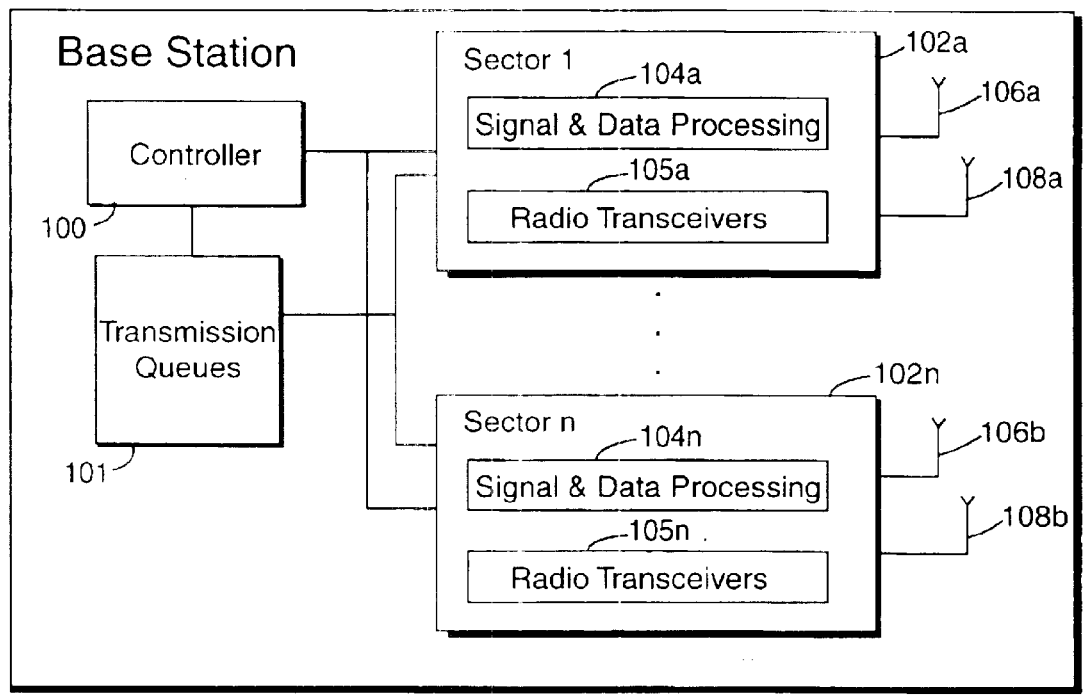
FIGS. 12 and 13 are function block diagrams illustrating in simplified form a base station and a mobile terminal that may be used in implementing the present invention.

FIG. 12 illustrates a base station in simplified function block format that may be used to implement the present invention. A base station controller 100 is coupled to multiple base station sectors 1–n identified as 102a–102n. Each sector includes signal and data processing hardware and software 104 as well as radio transceivers 105 coupled to one or more antennas. In this example, two antennas are shown for each sector 106 and 108. Each of the sector antennas may be treated as "overlaid" sectors. The controller 100 is coupled to data transmission queues 101. Each data transmission queue stores packets to be transmitted for an active connection with a mobile terminal. The controller 100 adjusts the power level of the radio transceiving circuitry 105 in each sector in accordance with a data packet transmission load associated with an active connection with a mobile terminal. In addition, depending upon sector selections by a mobile terminal, the controller 100 quickly switches the transmission queue output to the selected sector.

Figure 13:
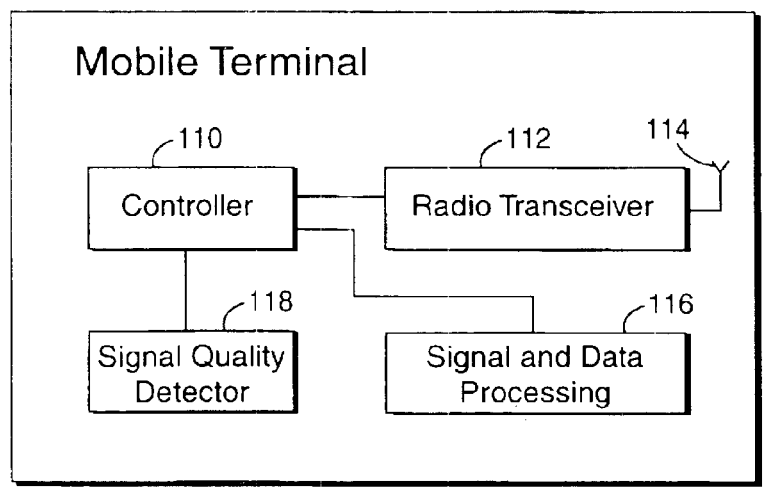

A simplified function block diagram of a mobile terminal that may be used to implement the present invention is shown in FIG. 13. A controller 110 is coupled to a radio transceiver 112, signal and data processing circuitry 116, and a signal quality detector 118. The radio transceiver 112 is coupled to an antenna 114. In a non-limiting, example embodiment, both the base station and the mobile terminal employ a spread spectrum radio access communication technique. The mobile terminal uses the signal quality detector 118 to detect the signal quality (e.g., signal-to-noise ratio) for each received sector pilot signal in its candidate list. The controller 110 may map each signal quality to a particular modulation and/or code rate using for example a lookup table. Alternatively, the signal quality could be forwarded to the base station and the corresponding modulation and code rate mappings could be made there. In an uplink power control implementation, the controller 110 controls the transmit power level of the radio transceiver 112 in accordance with a transmission load.

Figure 14:
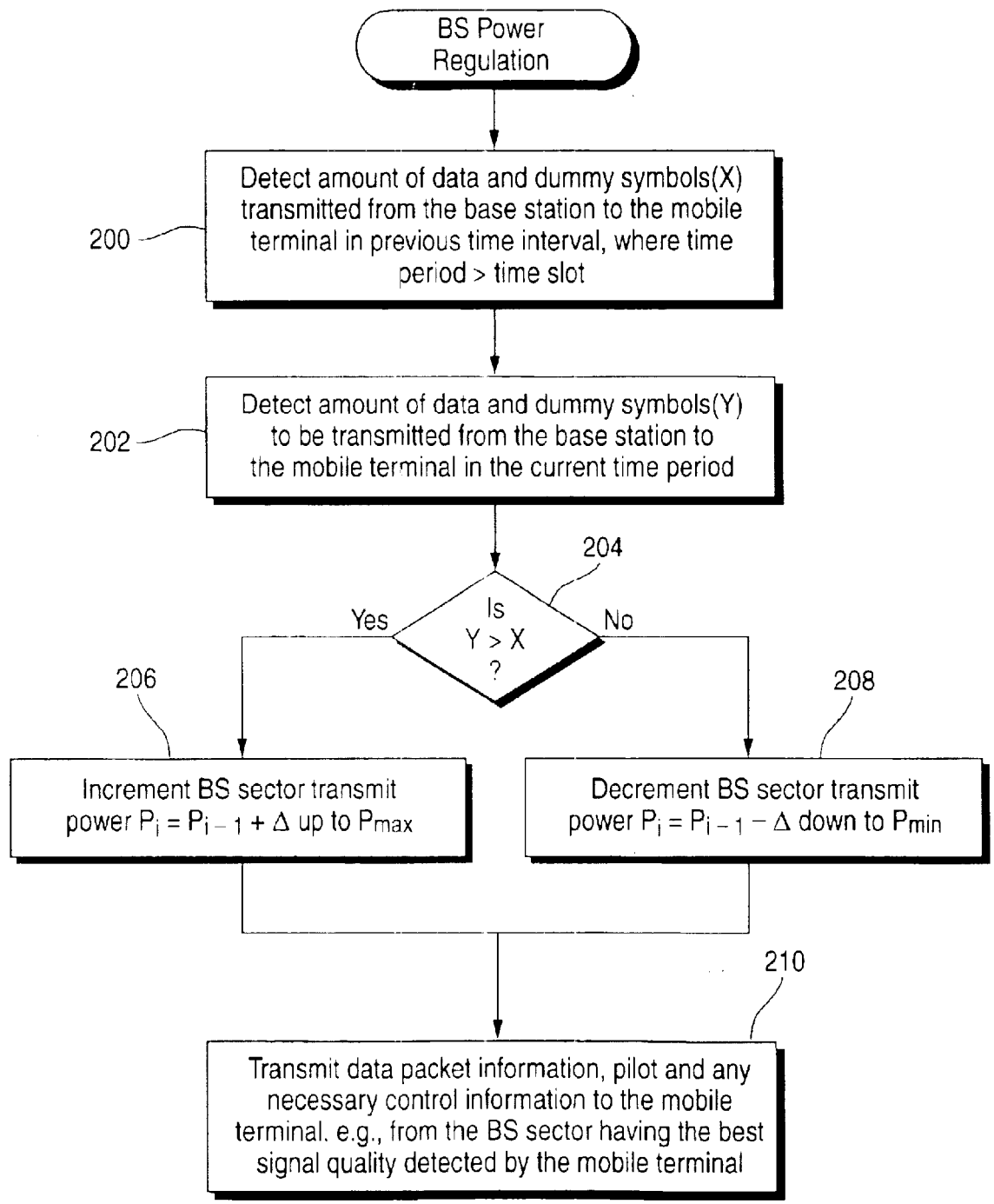
FIG. 14 illustrates example base station transmit power regulation procedures in accordance with the present invention.

FIG. 14 illustrates an example, non-limiting implementation of the present invention in a base station access point power regulation routine that may be performed by the base station. The power regulation is based on an average transmission load over one or more power control time periods. However, those skilled in the art will appreciate that the power regulation of a base station may also be performed by a base station controller connected to plural base stations, such as a radio network controller 26 shown in FIG. 11. The controller 100 in the base station detects the amount of data and/or dummy symbols (amount X) transmitted from the base station to the mobile terminal in a previous power control time period, where the length of the power control time period is greater than the length of a signal quality measurement time slot (block 200). The controller 100 also detects the amount (amount Y) of data stored in the corresponding transmission queue 101 for this mobile terminal including the amount of any dummy symbols to be transmitted, to the mobile terminal in the current time period (block 202). A decision is made in block 204 whether the current amount of data and/or dummy symbols Y is greater than an amount of data and/or dummy symbols X transmitted during one or more previous time periods. If so, the controller 100 sends a command to the corresponding base station sector 102 to increase its current transmit power by an incremental amount A, up to a maximum power $P_{max}$, i.e., $P_i = P_{i-1} + \Delta$ (block 206). Otherwise, the base station sector is instructed to decrement the transmit power by Δ down to a minimum power $P_{min}$, i.e., $P_i = P_{i-1} - \Delta$ (block 208). The base station sector 102 having the best signal quality detected by the mobile terminal transmits the data packet information (including any dummy symbols), pilot signal, and any necessary control information to the mobile terminal via the signal and data processing circuitry 104 and radio transceiver circuitry 105 (block 210).

While the present invention has been described with respect to a particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. For example, although the description above focuses on downlink adaptation, the present invention may be used in uplink adaptation. Therefore, while the present invention is described in relation to preferred example embodiments, it is to be understood that this disclosure is only illustrative and exemplary of the present invention. Accordingly, it is intended that the invention be limited only by the scope of the claims appended hereto.

What is claimed is:

1. A first radio station configured to communicate with a second radio station over a radio interface, comprising:
    signal processing and radio transceiving circuitry;
    a transmit buffer storing data packets for transmission to the second radio station and coupled to the signal processing and radio transceiving circuitry; and
    data processing circuitry, coupled to the transmit buffer and to the signal processing and radio transceiving circuitry, configured to adjust the transmit power at which the data packets are transmitted by the radio transceiving circuitry to the second radio station based on a transmission load over a predetermined time period,
    wherein the transmission load corresponds to an amount of data transmitted from or to be transmitted from the first radio station to the second radio station, and
    wherein the data processing circuitry is configured to perform the following tasks:
    detecting a first amount of packet data currently stored in the transmit buffer;
    comparing the first amount of packet data with a second amount of packet data previously detected in the transmit buffer; and
    determining an average transmission load using the first and second amounts of packet data.

2. The first radio station in claim 1, wherein the predetermined time period is greater than one time slot of information in which packet data are sent.

3. The first radio station in claim 1, wherein when the transmission load is increasing, the data processing circuitry is configured to control the radio transceiving circuitry to transmit the packet data at a higher transmit power, and wherein when the transmission load is decreasing, the data processing circuitry is configured to control the radio transceiving circuitry to transmit the packet data at a lower transmit power.

4. The radio station in claim 1, wherein if the first amount of data exceeds the second amount of data, then the data processing circuitry is configured to control the radio transceiving circuitry to increase by an incremental amount the transmit power of the transceiving circuitry.

5. The radio station in claim 1, wherein if the first amount of data does not exceed the second amount of data, then the data processing circuitry is configured to control the radio transceiving circuitry to decrease by a decremental amount the transmit power of the transceiving circuitry.

6. The radio station in claim 1, wherein the first radio station is a mobile terminal and the second radio station is a base station.

7. The radio station in claim 1, wherein the first radio station is a base station and the second radio station is a mobile terminal.

8. The radio station in claim 7, wherein the base station includes plural sectors, at least one of the sectors including:
    signal processing and radio transceiving circuitry;
    a transmit buffer storing data packets for transmission to the mobile terminal and coupled to the signal processing and radio transceiving circuitry; and
    data processing circuitry, coupled to the transmit buffer and to the signal processing and radio transceiving circuitry, configured to adjust the transmit power at which the data packets are transmitted by the radio transceiving circuitry to the second radio station based on a transmission load over a predetermined time period associated with the communication between the first radio station and the second radio station.

9. A first radio station configured to communicate with a second radio station over a radio interface, comprising:
    signal processing and radio transceiving circuitry;
    a transmit buffer storing data packets for transmission to the second radio station and coupled to the signal processing and radio transceiving circuitry; and
    data processing circuitry, coupled to the transmit buffer and to the signal processing and radio transceiving circuitry, configured to adjust the transmit power at which the data packets are transmitted by the radio transceiving circuitry to the second radio station based on a transmission load over a predetermined time period,
    wherein the transmission load corresponds to an amount of data transmitted from or to be transmitted from the first radio station to the second radio station, and
    wherein the adjustment to the transmit power occurs less frequently than a determination by the mobile terminal of a signal quality of a received base station transmission.

10. A base station transmitting information over a radio interface to mobile terminals, wherein the base station is configured to gradually adjust the power that data is transmitted to a first mobile terminal based on a transmission load corresponding to an amount of data transmitted from or to be transmitted from the base station to the first mobile terminal,
    wherein the radio channel quality is measured by another mobile terminal every second time period, the second time period being shorter than the first time period.

11. The base station in claim 10, wherein the radio channel quality is based on a ratio of a desired signal to undesired signals.

12. The base station in claim 10, wherein as the transmission load increases, the power is increased, and as the transmission load decreases, the power is decreased.

13. The base station in claim 10, further comprising plural sectors, at least one of the sectors being configured to gradually adjust the power that data is transmitted to a first mobile terminal based a transmission load associated with the communication between the one base station sector and the mobile terminal so that a radio channel quality influenced by the one base station sector data transmission to the first mobile terminal is not significantly affected by the transmit power adjustment.

14. A base station transmitting information over a radio interface to mobile terminals, wherein the base station is configured to gradually adjust the power that data is transmitted to a first mobile terminal based on a transmission load corresponding to an amount of data transmitted from or to be transmitted from the base station to the first mobile terminal,
    wherein the transmission load includes an average transmission load over a first time period, and wherein the average transmission load takes into account an amount of dummy signals transmitted to or to be transmitted from the first mobile terminal.

15. A method for regulating a transmit power of a first radio station transmitting to a second radio station over a radio interface, comprising:

determining a data transmission load corresponding to an amount of data transmitted from or to be transmitted from the first radio station to the second radio station for a predetermined time period, and regulating the transmit power of the first radio station transmitting to the second radio station based on the determined data transmission loads, wherein the second radio station determines a signal quality of a first radio station transmission, and wherein the regulating step occurs less frequently than the signal quality determination by the second radio station.

16. The method in claim 15, wherein the determining and regulating are performed in the base station.

17. The method in claim 16, wherein the base station includes a base station sector.

18. The method in claim 15, wherein the determining and regulating are performed in a base station controller controlling plural base stations.

19. The method in claim 15, wherein the data transmission load is an average data transmission load based on an amount of data packets transmitted to or to be transmitted to the second radio station over a current time period.

20. The method in claim 19, wherein the average data transmission load is based on a number of data symbols transmitted to or to be transmitted to the second radio station over a previous time period.

21. The method in claim 20, wherein when the average transmission load is higher, the transmit power is higher, and wherein when the average transmission load is lower, the transmit power is lower.

22. The method in claim 15, wherein the predetermined time period is greater than one time slot of information in which data are sent.

23. The method in claim 15, wherein the determining and regulating steps are performed for a base station transmitting to a mobile terminal.

24. The method claim 15, wherein the first radio station is a terminal and the second radio station is a base station.

25. A method for regulating a transmit power of a first radio station transmitting to a second radio station over a radio interface, comprising:

determining a data transmission load corresponding to an amount of data transmitted from or to be transmitted from the first radio station to the second radio station for a predetermined time period.

regulating the transmit power of the first radio station transmitting to the second radio station based on the determined data transmission load, wherein the data transmission load is an average data transmission load based on an amount of data packets transmitted to or to be transmitted to the second radio station over a current time period, wherein the average data transmission load is based on a number of data symbols transmitted to or to be transmitted to the second radio station over a previous time period, and wherein the average data transmission load takes into account an amount of dummy symbols transmitted to or to be transmitted to the second radio station over a predetermined time period.

26. A method for regulating a transmit power of a first radio station transmitting to a second radio station over a radio interface, comprising:

determining a data transmission load corresponding to an amount of data transmitted from or to be transmitted from the first radio station to the second radio station for a predetermined time period, and regulating the transmit power of the first radio station transmitting to the second radio station based on the determined data transmission load, the method further comprising:

detecting a first amount of data currently buffered to be transmit to the second radio station;

comparing the first amount of data with a second amount of data previously transmitted to the second radio station;

determining the data transmission load using the first and second amounts of packet data.

27. The method in claim 26, wherein if the first amount of data exceeds the second amount of data, increasing by an incremental amount the transmit power.

28. The method in claim 27, wherein if the first amount of data does not exceed the second amount of data, decreasing by a decremental amount the transmit power.

* * * * *